United States Patent [19]

Schmerler

[11] Patent Number: 5,281,992

[45] Date of Patent: Jan. 25, 1994

[54] METHOD OF PRODUCING PHOTOGRAPHIC PRINTS AND AN EXPOSURE MEANS FOR CARRYING OUT SAID METHOD

[76] Inventor: Detlev Schmerler, Albert-Schweitzer-Strasse 30, D-0-4300 Quedlinburg, Fed. Rep. of Germany

[21] Appl. No.: 908,157

[22] Filed: Jul. 2, 1992

[30] Foreign Application Priority Data

Jul. 5, 1991 [DE] Fed. Rep. of Germany ....... 4122357

[51] Int. Cl.⁵ ............................................. G03B 27/80
[52] U.S. Cl. ..................... 355/38; 358/527; 358/524; 358/302; 355/45
[58] Field of Search .................. 355/20, 32, 35, 38, 355/45; 358/76, 78, 302

[56] References Cited

U.S. PATENT DOCUMENTS

| | | |
|---|---|---|
| 4,676,628 | 6/1987 | Asbury, III ........................ 355/38 |
| 4,816,874 | 3/1989 | Terashita et al. .................. 355/38 |
| 4,875,071 | 10/1989 | Shiota ............................. 355/20 |
| 4,933,773 | 6/1990 | Shiota et al. ..................... 358/302 |
| 4,942,462 | 7/1990 | Shiota ............................. 358/76 |
| 5,006,886 | 4/1991 | Suzuki ............................. 355/46 |
| 5,019,858 | 5/1991 | Suzuki ............................. 355/35 |

Primary Examiner—Richard A. Wintercorn
Attorney, Agent, or Firm—Ralph H. Dougherty

[57] ABSTRACT

A method of producing photographic prints in a printer is provided, in which it is possible to adjust at least the color composition of the light to be emitted by an exposure means of the printer, an image of a master photographic image being reproduced on the screen of a color monitor by making use of an image converter means, which is adapted to be introduced temporarily into the ray path of the printer. The monitor image is calibrated at least with regard to the color of a first optimized print while maintaining the copying light constant. An exposure means suitable for carrying out this method is also described.

9 Claims, 1 Drawing Sheet

METHOD OF PRODUCING PHOTOGRAPHIC PRINTS AND AN EXPOSURE MEANS FOR CARRYING OUT SAID METHOD

BACKGROUND OF THE INVENTION

The present invention relates to a method of producing photographic prints in a printer, which is adapted to be adjusted with regard to a color composition of a light to be emitted by an exposure means, an f-number and/or an exposure time. Furthermore, the present invention relates to an exposure means for a method of producing photographic prints.

DESCRIPTION OF RELATED ART

German Patent 35 27 853 discloses such a method of producing photographic prints in a printer as well as such an exposure means. This known method is supposed to permit compensation for all the influences acting on the colors and perhaps also on the brightness of the print to be produced. The influences to be compensated for are, for example, color distortion, or incorrect brightness values of the master photographic image, the temperature and the age of the photochemical substances, the properties of the photographic paper, the temperature and the age of the light source in the printer, and the like. In this known method, copying light is picked up in the image plane of the printer with the aid of an image converter means, and the output signal of the image converter means is supplied to a monitor so as to reproduce the recorded image on the monitor. In view of the fact that the image converter means normally will not cover the whole image of the master photographic image in the image plane of the printer, but will only pick up a small subsection, the light falling on the image converter means will have little intensity so that difficulties may arise with regard to the production of sufficiently strong image converter output signals. Hence, the quality of the monitor image may not be sufficient to permit satisfactory calibration whereby the quality of the resulting color prints will leave much to be desired.

OBJECTS OF THE INVENTION

In view of this prior art, the principal object of the present invention is to provide a method and a device for producing photographic prints in such a way that the color quality of the prints is improved.

SUMMARY OF THE INVENTION

The foregoing object is achieved by a method of producing photographic prints in a printer, which is adapted to be adjusted with regard to a color composition of a light to be emitted by an exposure means, an f-number (f-stop) and/or an exposure time, comprising the steps of:

a) producing at least one first optical print from a first master photographic image for adjusting the printer at least with regard to the color composition of the light emitted by the exposure means;

b) recording the first master photographic image with the aid of an image converter means and reproducing the recorded image on a monitor;

c) calibrating the monitor image at least with regard to the color of the first optimized print while maintaining the copying light constant;

d) adjusting the exposure means with regard to the color composition and/or the f number and/or the exposure times of the exposure means until the monitor image has been optimized for an additional master photographic image; and e) producing a print of the additional master photographic image by forming an image thereof on a photographic material for the print via an enlarging lens and with the adjustment of the exposure means determined in method step d), wherein while carrying out step b) the enlarging lens is removed from the ray path and replaced by the image converter means.

According to the invented method, an image converter means is inserted instead of the enlarging lens, or rather is placed at the position previously occupied by the enlarging lens. A master photographic image is sharply imaged in a plane which is different from the image plane of the printer and which coincides with the recording plane of the image converter means. It will be advantageous when the master photographic image is imaged in the recording plane of the image converter means in such a way that the resultant picture of the master image corresponds approximately to the size of the image converter means. In this case, the maximum light intensity will be obtained in the recording plane. If the size of the picture in the recording plane of the image converter means exceeds the size of the image converter means, the intensity of the light falling on the converter means will decrease, but it will still suffice to obtain electric signals which are suitable for further processing.

It follows that, within the framework of the present invention, it will be possible to carry out the desired calibration in a plane which is different from the focusing plane of the printer.

It will be advantageous when the enlarging lens of the exposure means and the image converter means are attached to a common holding means, which can be moved such that either the enlarging lens or the image converter means can selectively be introduced in the ray path.

In accordance with an advantageous alternative embodiment, the holding means is constructed as a rotating turret, which can also have attached thereto additional enlarging lenses which are selected depending on the enlargement desired.

Another advantageous alternative embodiment, the holding means is so arranged that it can be displaced relative to the optical axis so that, by means of displacement, either an enlarging lens or the image converter means can be introduced into the ray path.

BRIEF DESCRIPTION OF THE DRAWINGS

The present invention will be more readily understood by referring to the following detailed description and the appended drawings in which.

DETAILED DESCRIPTION

Figure 1:
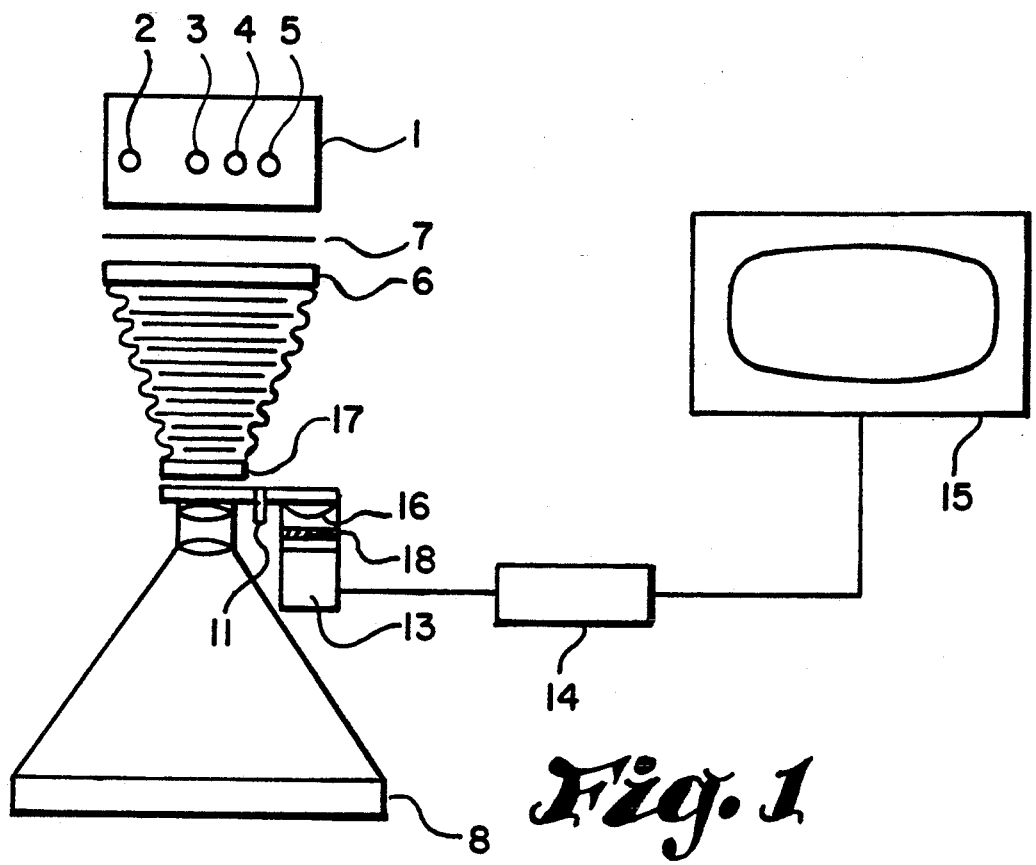
FIG. 1 is a schematic side view of an exposure means according to the present invention.

An exposure means, which is known per se, is shown in FIG. 1 and is provided with a color head 1. A number of color filters is accommodated in the color head 1, the color filters being adapted to be used for adjusting the color temperature of the light emitted by the color head 1. Above the adjustable color filters, a projection light source is arranged, which emits preferably white light. The color filters can be adjusted individually via filter adjusting wheels 2, 3 and 4. The color head 1 includes also a diaphragm 5 by means of which the amount of light leaving the color head can be adjusted. This diaphragm 5 can be realized e.g. by a rotatable pinhole diaphragm with exchangeable pinhole diaphragm sets having different sizes of pinholes, or by an iris diaphragm, which is introduced into the ray path. However, the diaphragm preferably used is a pinhole diaphragm set, since the use of an iris diaphragm will influence the depth of field. Below the color head 1, a film support means 6 is provided on which a master photographic image 7 in the form of a negative or in the form of a diapositive can be arranged.

The film support means 6 is followed by a bellows 9. At the side located opposite the film support means 6, the bellows 9 is delimited by an end plate 17, which has formed therein a light passage opening. A supporting plate 8 for a photographic paper to be exposed is arranged below the bellows 9.

A holding means 10 is provided, which is adapted to be moved axially together with the end plate 17 of the bellows 9. The holding means 10 is constructed as a disc, preferably a circular disc, which is adapted to be rotated about a fastening screw 11. The holding means 10 is provided with a plurality of openings 20 to 21, which can be seen in FIG. 2. Three openings have secured therein enlarging lenses, one of the enlarging lenses being provided with reference numeral 12. These enlarging lenses serve to form an enlarged sharp image of a master photographic image 7, which is held on the film support means 6, on a photographic paper located on the supporting plate 8. The fourth opening of the holding means 10 has arranged therein an image converter means, which is constructed as a CCD camera 13. The CCD camera 13 includes a zoom lens 16.

An example of a suitable small CCD camera that can be inserted into holding means 10 with the use of a simple spacer ring is model XC711RR produced by SONY.

By rotating the holding means 10 about the fastening screw 11, either an enlarging lens 12 or the CCD camera 13 can be selectively introduced into the ray path of the exposure means.

The signal output of the CCD camera 13 is connected to a circuit 14, which is, in turn, connected to a color monitor 15. Hence, a picture of the master photographic image on the image converter means of the CCD camera 13 can be visibly displayed on the monitor 15. With the aid of the circuit 14, the color and the brightness can be adjusted with respect to their reproduction on the color monitor 15.

In a manner similar to the one employed in the exposure means of applicant's German Patent 35 27 853, the circuit 14 is equipped with a change-over means, and, when the change-over means is actuated, the input signal supplied to the circuit can be converted into a complementary signal with regard to color as well as with regard to brightness. Furthermore, the circuit 14 is adapted to be used for adjusting the respective color content of each of the three primary colors of the output signal of the circuit. In addition, it is possible to affect a brightness adjustment of the output signal. The output signal of the circuit 14 for adjusting the color and the brightness is supplied to a commercially available color monitor 15.

Preferably, each of the three color output signals of the circuit 14 controls directly the respective color component of the color monitor 15. However, the output signal of the image converter means 13 and of the circuit 14 can also be a video signal, which is supplied to the video input of a color television receiver.

An example of a suitable circuit that performs the above noted functions such that it can be used without major modification is the AFR circuit produced by BESELER used in conjunction with the internal circuitry SONY 13 inch multiscan hi-resolution monitor, model GBM 1310.

For producing sharp and correctly exposed color prints which are free from color distortion, a test master photographic image 7, e.g. a negative or a diapositive, is first placed onto the film support means 6. With regard to color distortion and with regard to brightness deviations from natural brightness values, it is possible to determine on the basis of a first test print to what extent the adjustment of the color filter adjusting wheels 2 to 4, of the f-number and of the exposure time must be modified. After such a correction of the adjustment of the color head 1, of the exposure value and of the exposure time as well as, if necessary, of the sharpness, another test print is produced. If this test print should still show color distortion, an additional correction of the adjusted values is carried out, until the test print shows the best possible image quality. The CCD camera 13 is then pivoted into the ray path of the exposure means. The lens arrangement 16, which is part of the CCD camera 13 and which is preferably constructed as a zoom lens, is adjusted such that the master photographic image 7 is sharply imaged in the recording plane of the CCD camera 13.

The image converter means included in the CCD camera 13 has applied thereto an image of at least part of the test master photographic image 7, i.e. of a negative or of a diapositive, with a composition of the light and with an exposure intensity corresponding to those which produced the optimum result determined on the basis of the test print. Now the adjustment of the color composition and of the brightness of the monitor image of the color monitor 15 are optimized by means of the circuit 14 used for color and brightness adjustment. This method step serves to calibrate the CCD camera 13, the circuit 14 and the color monitor 15, all the influencing quantities, which determine the color values and the brightness values of the prints, being taken into account in this respect.

The first test master photographic image 7 is now removed from the film support means 6 and replaced by an additional master photographic image, i.e. a negative or a diapositive. The image, which is shown on the color monitor 15 as a positive image in the case of a diapositive as well as in the case of a negative, will show a certain degree of color distortion and insufficient or excessive brightness in accordance with the color distortion and the under- or over- exposure of the colored master photographic image.

Maintaining the adjustment of the circuit 14, the adjustment of the color head 1 is now optimized by actuating the color filter adjustment wheels 2 to 4 as well as the diaphragm 5; in so doing, the exposure time can be readjusted as well. In view of the fact that a change in the exposure time will find expression in the brightness of the print, but cannot directly be expressed on the color monitor 15, the CCD camera 13 has preferably provided therein a diaphragm 18, is opened in accordance with the extension of the exposure time or which is closed in the case of a reduction of the exposure time, so as to achieve a corresponding variation of the brightness of the monitor image. After the optimization of the color monitor image by the above-mentioned adjustments, the CCD camera 13 is removed from the ray path and the enlarging lens 12 is introduced into the ray path of the exposure means. Making use of the f-number ascertained, of the exposure time ascertained and of the sharp focus as well as of the color filter adjustment which has been carried out, photographic paper is placed on supporting plate 8, exposed and then developed. In view of the fact that the original adjustment of the circuit 14 takes into account all errors, which have been caused e.g. by ageing of the lamp and of the color head, or by changes in the photochemical substances and the like, the print produced from the additional master photographic image, i.e., from a negative or from a diapositive, will inevitably show optimum image quality.

In view of the fact that, when the calibration process is carried out, the CCD camera 13 is pivoted into the ray path of the exposure means, the light-sensitive image converter unit is acted upon by high light intensity. It follows that the image obtained on the screen of the color monitor 15 will be an image of satisfactory quality.

It is not necessary that the whole master photographic image 7 is imaged on the image converter means contained in the CCD camera 13. It will be sufficient to image a sub-area on the image converter means, since, for the purpose of calibration, it will suffice to view on the screen of the color monitor 15 only a detail of the positive to be produced because an optimization of the adjustment can also be carried out on the basis of this representation of a detail.

Figure 2:
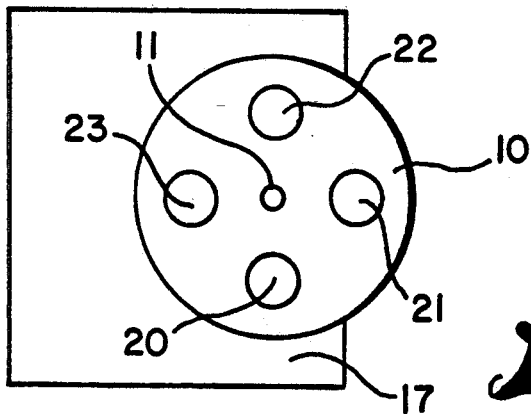
FIG. 2 is a top view of a holding means constructed as a rotating turret and used for the image converter means and for enlarging lenses.

FIG. 2 shows an embodiment of the holding means 10, which is constructed as a circular disc with four openings 20, 21, 22, 23. One of the four openings serves to fasten the CCD camera 13, whereas respective lenses with different enlarging factors can be screwed into each of the other three openings. By rotating the circular disc 10, a desired lens or the CCD camera 13 can be inserted into the ray path.

Figure 3:
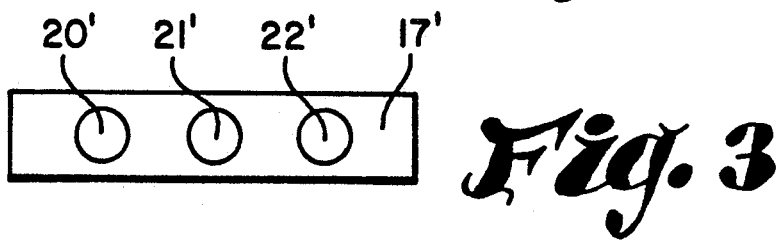
FIG. 3 is a top view of a displaceable holding means for the enlarging lenses and the image converter means.

FIG. 3 shows a different structural embodiment of the holding means 10 for the CCD camera 13 and a lens, respectively. According to FIG. 3, the holding means 17' is constructed as a strip-shaped plate provided with three openings 20', 21' and 22'. One of these openings serves to receive therein the CCD camera 13, whereas the other two openings serve to receive therein respective lenses preferably having different enlarging factors.

The lens means of the CCD camera 13 preferably includes an achromat, which serves to compensate for the short distance between the lens means of the CCD camera 13 and the object plane given by the master photographic image 7. Different sizes of negatives are compensated for by means of the zoom lens. Focussing is effected by varying the bellows adjustment level.

It follows that within the framework of the present invention, a conventional manual photographic laboratory can be automated at a price amounting only to a fraction of the price of a video analyzer, and a photographic laboratory equipped in accordance with the present invention will be able to provide photographs having an image quality which cannot be achieved by means of a video analyzer, which is much more expensive.

The invented method as well as the exposure means of the invention permit a photographer to exert any desired influence on the image of a print upon carrying out the exposure, and, due to the calibration of the reproduction on the color monitor by means of an image of high light intensity or by an image sub-area of high light intensity, the occurrence of calibration errors can be almost excluded so that color prints of excellent quality are obtained.

SUMMARY OF THE ACHIEVEMENT OF THE OBJECTS OF THE INVENTION

From the foregoing, it is readily apparent that I have invented an improved method and an improved device for producing photographic prints in such a way that the color quality of the prints is better than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An exposure means for producing photographic prints, comprising a source of copying light, a support means for a master photographic image, an enlarging lens for said master photographic image, color filters adapted to be introduced into the ray path between the source of copying light and the master photographic image, and an image converter means, wherein:

the image converter means is provided with a lens arrangement;

the enlarging lens and the image converter means are attached to a common holding means, which is adapted to be moved relative to the optical axis of the exposure means such that either the enlarging lens or the image converter means can selectively be introduced into the ray path; and by means of said lens arrangement, at least sub-areas of the master photographic image can be imaged sharply in the recording plane of the image converter means and on said image converter means.

2. An exposure means according to claim 1, wherein the holding means for the enlarging lens and the image converter means is constructed as a rotatable turret plate.

3. An exposure means according to claim 1, wherein the holding means for the enlarging lens and the image converter means is constructed as a holding means which is adapted to be displaced at right angles to the optical axis.

4. An exposure means according to claim 1 wherein the image converter means has connected thereto a circuit for adjusting the color and the brightness of the image converter means signal.

5. An exposure means according to claim 2, wherein the circuit for adjusting the color and the brightness is connected to a color monitor.

6. An exposure means according to claim 4, wherein the circuit for adjusting the color and the brightness converts the image converter signal into a signal which is complementary with regard to the color and the brightness of said image converter signal.

7. An exposure means according to claim 1, wherein the area of the image converter means is dimensioned such that only part of the image produced in the image plane of the image converter means will be picked up by said image converter means.

8. An exposure means according to claim 1, wherein the image converter means is CCD camera.

9. An exposure means according to claim 1, wherein the image converter means is provided with a zoom lens located in its imaging ray path.

* * * * *